SYMBOL PRINTER WITH MEANS TO PRINT IN TWO DIRECTIONS

Filed April 17, 1964 5 Sheets-Sheet 1

INVENTOR.
KENNETH D. PETERS
BY Allan Ratner

SYMBOL PRINTER WITH MEANS TO PRINT IN TWO DIRECTIONS

Filed April 17, 1964 5 Sheets-Sheet 2

INVENTOR.
KENNETH D. PETERS

BY Allan Ratner

Aug. 30, 1966 K. D. PETERS 3,269,510

SYMBOL PRINTER WITH MEANS TO PRINT IN TWO DIRECTIONS

Filed April 17, 1964

5 Sheets-Sheet 3

INVENTOR.
KENNETH D. PETERS

BY Allan Ratner

INVENTOR.
KENNETH D. PETERS
BY
Allan Ratner

INVENTOR.
KENNETH D. PETERS

BY Allan Ratner 3,269,510

SYMBOL PRINTER WITH MEANS TO PRINT IN TWO DIRECTIONS

Kenneth D. Peters, Navesink, N.J., assignor to Electronic Associates Inc., Long Branch, N.J., a corporation of New Jersey Filed Apr. 17, 1964, Ser. No. 360,496
3 Claims. (Cl. 197—53)

This invention relates to printing apparatus and has for an object the provision of a device for printing numbers, letters, and symbols.

Printing devices have had considerable use in many applications, such as typewriters, tape printers, page printers and the like. In many of the foregoing applications it is an important requirement that the printing devices have a high rate of printing speed and a very high reliability. This is particularly important when the printing device is used in conjunction with a recording equipment, such as a plotter which records one variable against another and which is used as an output device with an analog computer, which plotters are described, for example, in "Computer Handbook," edited by Huskey and Korn, McGraw-Hill, 1962, at pp. 18–50 et seq. In such applications a printing device may be mounted on a carriage along with a pen, both of which are moved in both the X and Y direction to a desired coordinate location. The pen is utilized to mark the recorded position while the printing apparatus may be actuated to print the coordinates or other information about the points being recorded.

In addition to speed and reliability in such applications it is a further requirement that the printing device be compact and light in weight since it is being moved about with respect to the medium being printed. While many different types of printers have been made, they left much to be desired in meeting all of the above requirements. In addition, such prior printers were limited in the total number of discrete symbols that they could print.

Accordingly an object of the present invention is a printing device which is reliable, of simple construction, light in weight and compact while having a high printing rate.

In accordance with the present invention there is provided a printing device comprising a rotatable symbol wheel which may be actuated for printing a desired symbol. Drive means rotates the symbol wheel by way of a resilient member. The symbol wheel may be stopped at a desired position for printing and the drive means is free to rotate so that energy is stored in the resilient member. After printing, the symbol wheel is released and the energy stored in the resilient member provides an acceleration to the symbol wheel so that the wheel rapidly turns to its next printing position.

In a preferred form of the invention the symbol wheel is secured to a drive shaft and a drive wheel is rotatably mounted on the shaft. The resilient member is connected between the drive wheel and the shaft. The drive wheel is rotated and that rotation is transmitted through the resilient member to the shaft thereby to rotate the symbol wheel. When a desired symbol of the symbol wheel is in a position for actuation the shaft is prevented from further rotation and the selected symbol may be actuated to print. With the shaft stopped the drive wheel is free to rotate so that energy is stored in the resilient member in the form of potential energy. After the symbol is actuated the shaft may be released thereby releasing the stored potential energy and imparting an instantaneous force on the symbol wheel causing its immediate rotation. In this manner the symbol wheel when released rapidly turns to its next printing position from its previous position.

In this way the printing device prints at a high rate of speed and as a result of the simplicity of operation, the device may be light in weight, compact and have high reliability. This high reliability is achieved in part as a result of the energy being stored in the resilient member so that the drive means turning the drive wheel is not suddenly stopped in its rotation during each printing interval which would ordinarily be the case. As a result the drive means is not shock stopped, but is slowly stopped as the force increases in the resilient member to a point at which it equals the driving force of the drive means. At that time the drive means is stalled, but the stall has been gradual.

In one form of the invention the drive wheel is a worm wheel driven by an electric motor through a worm. A helical torsion spring has one end secured to the worm wheel and the other end secured to the shaft. A binary code wheel is secured to the shaft and a code circuit is utilized to determine the position of the shaft in relation to a desired symbol. When the desired symbol is then in position for actuation a detent wheel secured to the shaft is engaged by a detent pawl which is effective to stop the rotation of the shaft and symbol wheel.

For further objects and advantages of the invention and for a description of its operation, reference is to be had to the following detailed description taken in conjunction with the accompanying drawings which schematically illustrate a printing device embodying the invention:

Figure 1:
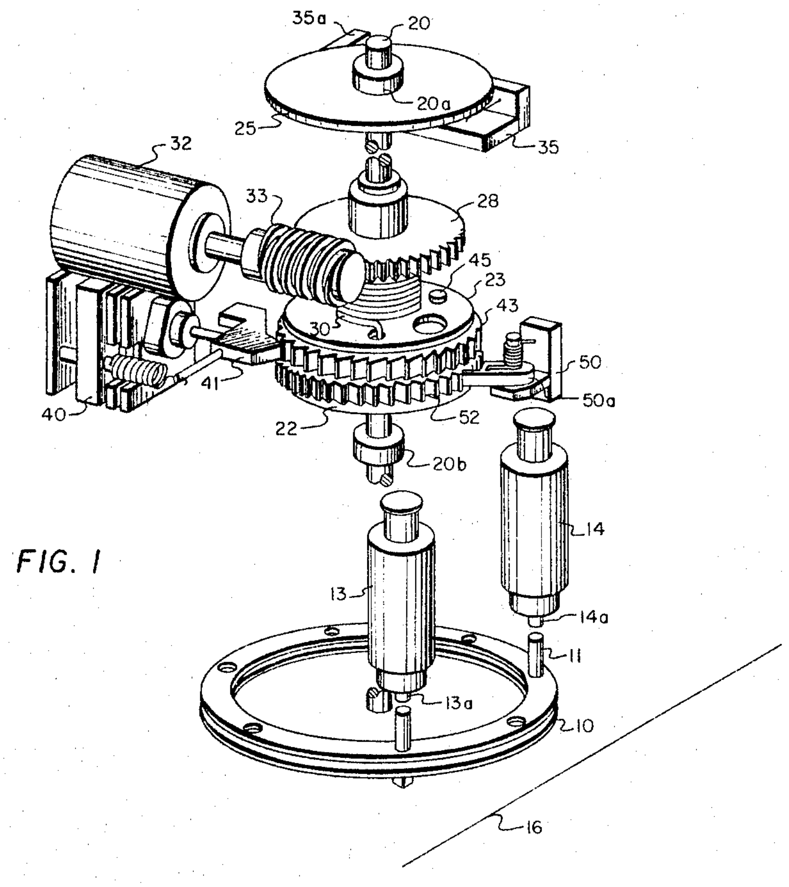
FIG. 1 shows an exploded view of the printing device.
Figure 1A:
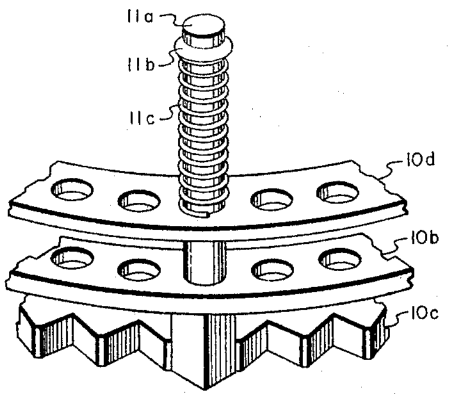
FIG. 1A is a view of a portion of the symbol wheel and a symbol slug.
Figure 2:
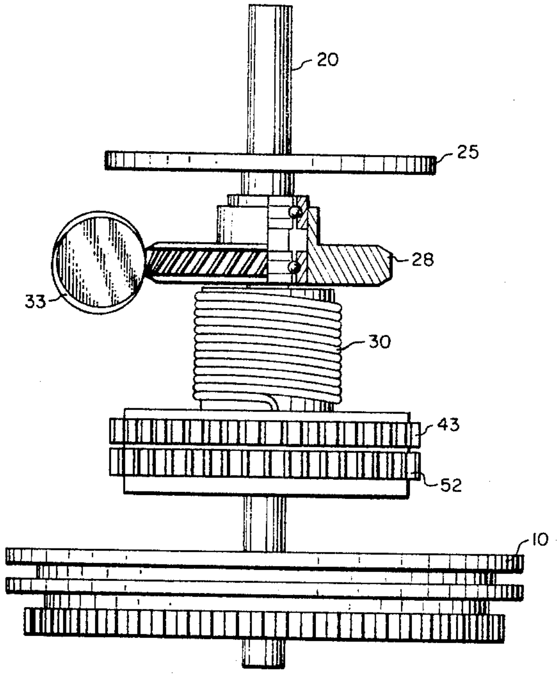
FIG. 2 shows the shaft and wheels as mounted for the device of FIG. 1.
Figure 4:
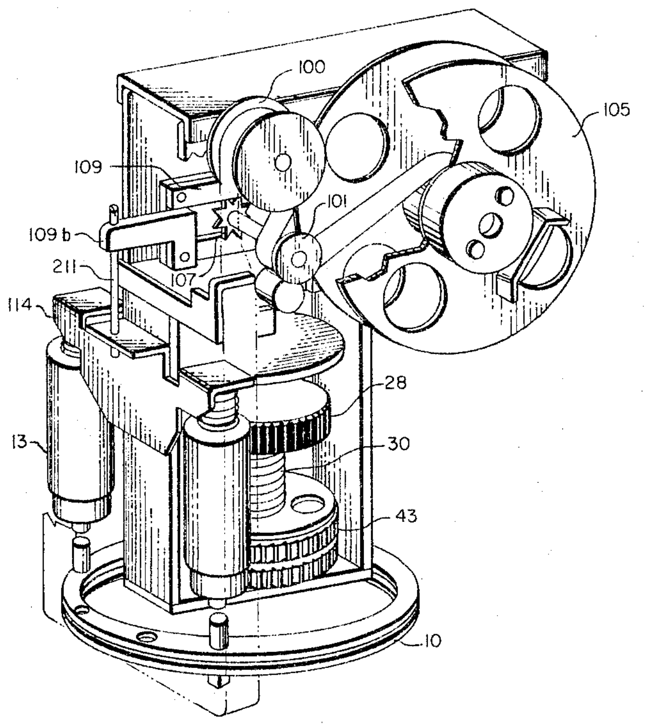
FIG. 4 is a cut-away view of the printing device of FIG. 1 including the ribbon escapement and the printer frame.

Referring now to FIGS. 1, 2 and 4 there is illustrated a printing device comprising a symbol wheel 10 having a plurality of openings on the periphery of the wheel each of which openings is adapted to receive a symbol slug 11, only two of which are shown to preserve clarity. As shown in more detail in FIG. 1A each symbol slug 11 comprises an upper cylindrically shaped portion and a lower squared portion. The symbol wheel 10 includes at its periphery an upper section 10*d*, a middle section 10*b* and a lower section 10*c*. Sections 10*d* and 10*b* have circular openings, while the lower portion 10*c* is notched to receive the lower squared portions of the symbol slugs 11. The circular openings provide for axial movement of the symbol slugs while the notched portion prevents radial movement of the slugs 11. The bottom of each slug 11 is engraved with a different discrete letter, number or symbol, while the upper portion 11*a* is grooved to receive an O ring 11*b*. A helical compression spring 11*c* is disposed about the slug 11 and between the upper portion 10*d* and the O ring 11*b* to maintain the slug in its normal upper portion with the squared portion of the slug meeting the bottom side of the middle portion 10*b*.

Plot solenoids 13 and 14 are secured to stationary members of the printer and are disposed so that their respective armatures or plungers 13*a* and 14*a* respectively are positioned above the slugs 11. Thus, the symbol wheel may be rotated until a desired symbol slug is directly below a plunger 13*a* for example. The solenoid 13 may then be energized causing the plunger to strike the upper portion of the symbol slug 11 pushing down on the slug and compressing the spring 11c. In this manner the engraved face of the slug is forced against ribbon 15 to print a symbol on the recording paper 16 on which the recording is being made. The solenoid 14 is displaced from the solenoid 13 by an angle of 90 degrees on the symbol wheel with its plunger 14a disposed above another slug 11. Thus, the symbol under armature or plunger 13a is displaced 90 degrees from the symbol under plunger 14a. For example, an "A" will be printed as illustrated when solenoid 13 is energized. If the symbol wheel 10 is rotated so that the foregoing symbol is now under plunger 14a there will be printed an "A" rotated 90 degrees from the previously printed "A."

The symbol wheel 10 is secured to a main shaft 20 to which is secured a clamp ring 22, a detent wheel hub 23 and a code wheel 25. The shaft 20 is mounted in bearings 20a and 20b which are secured to the printer frame. A worm wheel 28 is rotatably mounted on the shaft and free to rotate on its bearings which may be of the ball bearing type. A helical torsion spring 30 is disposed about the shaft 20 having one end connected to an axial hole (not shown) in the underside of the worm wheel 28 and having its other end similarly connected to a hole in the detent wheel hub 23. The worm wheel 28 is rotated by worm 33 fixed to the shaft of a driving motor 32 the frame of which is secured to a stationary member of the printing device. The driving motor 32 may be a conventional motor which is capable of being stalled, such as a permanent magnet D.C. electric motor. Upon energization of the drive motor 32, the worm 33 rotates which rotates the worm wheel 28, the helical spring 30, the detent hub 23, and the shaft 20 to rotate the symbol wheel 10 to its desired position. It will be understood that the motor 32 may be energized to rotate in both clockwise and counterclockwise directions so that the symbol wheel may also be rotated in both clockwise and counterclockwise directions. With the main shaft 20 free to rotate on its bearings 20a and 20b the rotational force applied to the worm wheel 28 is transmitted through the spring 30 directly to the hub 23 without any appreciable force being stored in the spring.

In order to position a desired symbol slug 11 under solenoid armature 13a, for example, there is provided a code wheel 25 which operates in conjunction with brushes 35 and 35a. Code wheels and brushes are well known in the art as are circuits for comparing the data appearing at the brushes with input data as disclosed for example in the above cited "Computer Handbook" at pp. 18–46 et seq. Such input data may correspond to the position of a desired symbol. A converter and control system is shown in block diagram in FIG. 1B and is shown and described in more detail in United States Patent 3,270,266 of which Michael A. Mulshine and Joseph F. Bryan are joint inventors, and which is entitled, "Control System," and assigned to the same assignee as the present invention.

Brushes 35 and 35a may each comprise six individual brushes, each of which includes a connection to a gate or brush choice selector 54. Gate 54 is operated so that either the signals from brushes 35 or the signals from brushes 35a are transmitted therethrough, and by way of a six-conductor cable 54a as one input to a coincidence detector or comparison circuit 55. As previously described, brushes 35 and 35a are displaced 90° from each other so that brushes 35 are used to detect when a desired symbol slug 11 is positioned under solenoid 13 while the brushes 35a are used to detect when a desired symbol slug is positioned under solenoid 14.

The other input to the detector 55 is input data from a source 56. Data is in the form of six bit words with each bit of each word corresponding to a particular one of the six brushes 35 or 35a. Detector 55 produces an output signal in the form of a high voltage pulse having a steep leading edge when an input word exactly agrees or corresponds to the brush data obtained by the six brushes on the code wheel 25. This correspondence indicates that the code wheel position and the input data word are in agreement, which means that the correct symbol is in position under a solenoid. For example, if it is assumed that gata 54 is operated so that the data from brush 35 is applied as an input to the detector 55, then that detector will produce a pulse output when the brush 35 data exactly agrees with the input data word from source 56. When such coincidence or agreement between the input data word and the code brush 35 data occurs, an output pulse is produced at output terminals 55a. That pulse is applied to energize solenoid 40 so that the symbol wheel 10 is stopped with the desired symbol slug 11 in actuation position under the solenoid plunger 13a.

The symbol wheel is stopped when solenoid 40 is energized since a pawl 41 is moved into engagement with a tooth of a detent wheel 43 which is secured between the detent wheel hub 23 and the clamp ring 22 by cap screws 45. In this way, upon coincidence of the input data word and the data from brushes 35 solenoid 40 is energized to operate the pawl 41 engaging the wheel 43 to stop the shaft 20 and the symbol wheel 10.

Figure 1B:
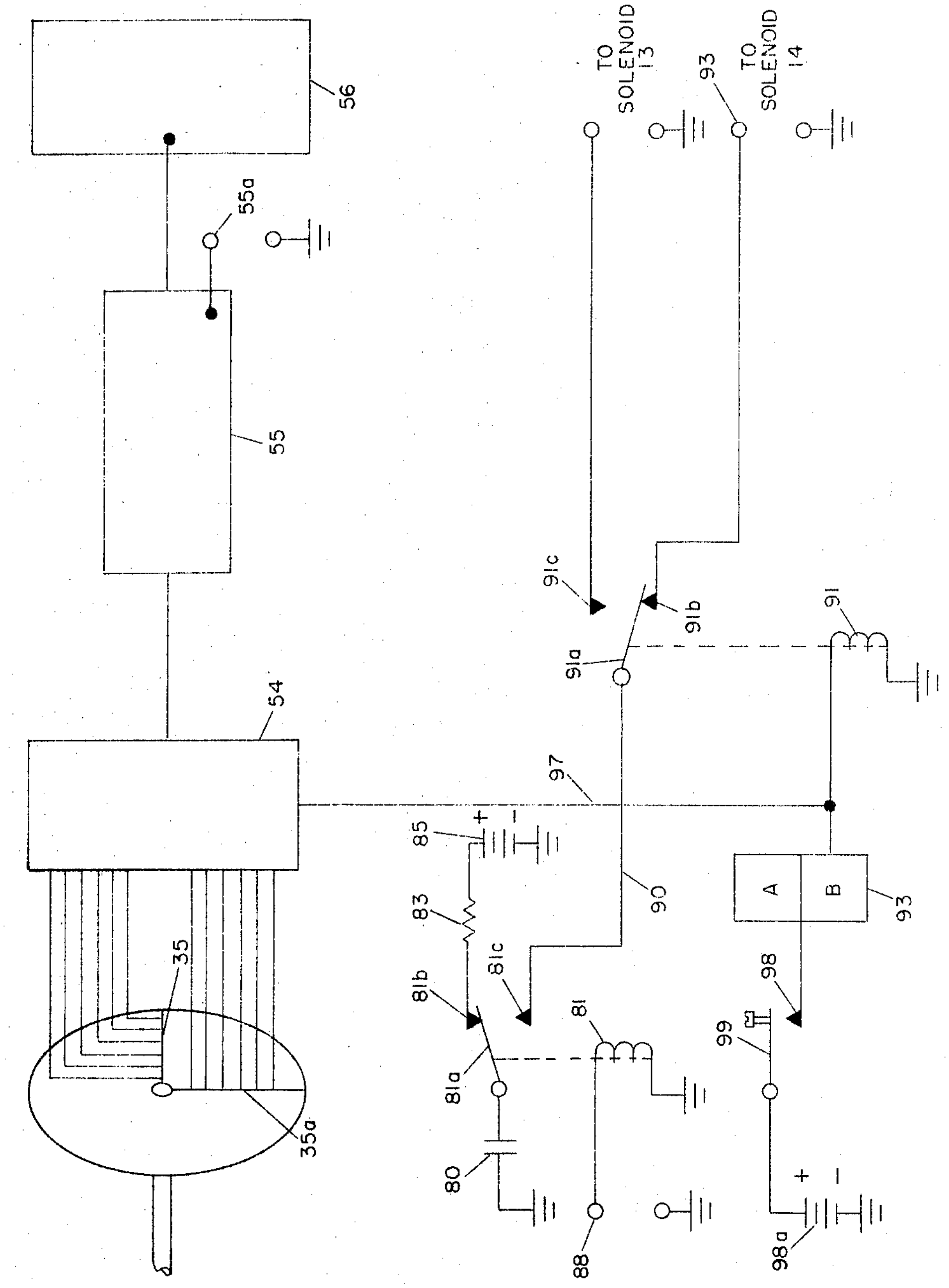
FIG. 1B is a schematic diagram of the electronic system for operating the printing device of FIG. 1.

In a similar manner gate 54 may be operated so that the output from brushes 35a are applied by way of conductor 54a as the input to detector 55. Thus, when there is coincidence between an input data word from source 56 and the code brush signal on brushes 35a, a pulse is applied by way of terminals 55a to energize solenoid 40 which is effective to stop the symbol wheel 10. In this manner a desired symbol slug 11 will be in a position under the solenoid plunger 14a of solenoid 14. For example, an input data word corresponding to the symbol "A" may be applied to detector 55 and when brushes 35a detect a signal agreeing with that data word, the "A" slug 11 will be positioned for actuation by the solenoid 14. In order to print "A" it is required that solenoid 14 be energized for actuation of its plunger 14a to print the symbol. For this purpose, there is provided an energization circuit as shown in FIG. 1B in which a capacitor 80 is normally charged by means of a charging circuit. That circuit may be traced from its right hand plate through relay arm 81a, contact 81b, resistor 83 to the positive side of a battery 85, the negative side of which is connected to ground.

With relay 81 in its normal position, arm 81a engages contact 81b, and it will be understood that capacitor 80 will be charged with its right hand plate positive with respect to its grounded left hand plate. A "plot" signal may be applied to terminal 88 which is connected to the relay coil of relay 81 to energize that relay to shift the arm 81a from contact 81b to contact 81c. Thus a discharge circuit may be traced for capacitor 80 by way of its right hand plate, conductor 90, relay arm 91a, contact 91b and terminal 93, which is connected to energize solenoid 14. In this manner the capacitor 80 discharges through solenoid 14, thereby to energize that solenoid for the capacitor 80 discharge time, which is selected to be sufficient to imprint the desired symbol.

It has been assumed in the above example that the relay arm 91a engages contact 91b which is the case when relay 91 is energized. That energization is provided by a selection circuit comprising a flip-flop 93 which determines whether the combination of brushes 35a and solenoid 14 is utilized, or the combination of a brush 35 and solenoid 13 is utilized. With relay 91 energized, the combination of brushes 35a and solenoid 14 has been selected, since the lower section B of flip-flop 93 is in its ON state while the upper section A is in its OFF state. The result, an output signal is produced by the B section of flip-flop 93, which is applied by way of conductor 95 to energize the coil of relay 91. The signal from the B section is also applied by way of a conductor 97 to an input of gate 54, to operate that gate so that the output of brushes 35a is conducted therethrough.

The trigger input of flip-flop 93 is connected by way of a conductor 98 and a switch 99 to the positive side of a battery 99a, the negative side of which is connected to ground. Thus, when the switch 99 is actuated one time, a positive going pulse is produced on conductor 98, providing a trigger input to flip-flop 93 switching its state. With the flip-flop 93 switched, section A is ON while section B is OFF deenergizing relay 91 so that arm 91a returns to its normal position to engage contact 91c to complete a circuit to solenoid 13. In addition, a change in the signal on conductor 97 is effective to switch the gate 54 so that the brush 35 data is transmitted to conductor 54a. In this way, with actuation of switch 99, flip-flop 93 may be switched between its stable states so that the data from either brushes 35 or 35a is utilized to actuate its respective solenoid.

After the shaft 20 has been prevented from further rotation, and during the time of energization of the desired solenoid, the wheel 28 will continue to rotate about the shaft and to wind the spring 30. Thus, in accordance with the invention, with the symbol wheel stopped and the printing operation being performed, the drive motor 32 may continue to rotate, and in this way, there is avoided shock stopping of the motor. As the spring 30 is wound, it begins to store more and more potential energy and it becomes more difficult for the drive motor to turn the worm wheel 28. As a result the motor 32 gradually decreases in speed.

When a new input data word is produced by the source 56, coincidence will be lost by the detector 55 and an output pulse will no longer be applied to energize solenoid 40. In this manner the detent solenoid 40 is deenergized. At that time, the spring 30 may have been wound to the point at which the force stored in that spring equals the drive force of the motor 32 and therefore at that time the motor 32 would have stalled. On the other hand the detent solenoid 40 may be deenergized before the spring would have been wound to that particular point and the motor would not have stalled but only would have decreased in speed. In either event, it will be understood that there is avoided shock stopping of the motor 32.

With the solenoid 40 deenergized the shaft 20 is free to rotate and the potential energy stored in the spring 30 is released with instantaneous release of energy is effective to cause the immediate rotation of the shaft and wheel 10. In this manner the symbol wheel 10 rapidly turns to its next printing position as determined by the code wheel 25.

A ratchet wheel 52 is disposed below the detent wheel 43 and about the main shaft 20 and is secured to the clamp ring 22 and detent wheel hub 23. An anti-backup ratchet 50 is secured to a fixed member of the printing device and has its moveable pawl 50a positioned to engage the teeth of the ratchet wheel 52. In this manner the shaft may turn clockwise as illustrated but is prevented from turning counterclockwise by such ratchet action.

Figure 2A:
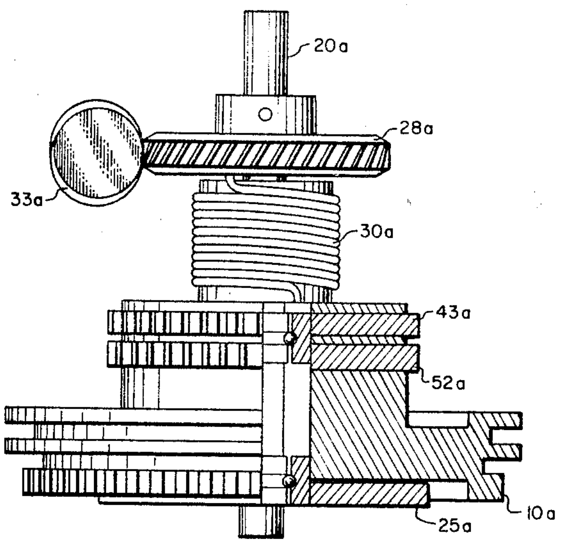
FIG. 2A is a modification of the invention in which the symbol wheel is rotatably mounted on the shaft.

Referring now to FIG. 2A there is shown a modification of the printing device of FIGS. 1 and 2 with the corresponding elements of the printing apparatus being identified by the same reference character as in FIG. 1 plus a suffix. In FIG. 2A worm wheel 28a is fixedly secured to the shaft 20a, while the symbol wheel 10a, the detent wheel 43a, and the code wheel 25a are rotatably mounted on the shaft 20a, as by ball bearings. The last-named three wheels are secured together into a rigid assembly by means of conventional fastening devices. The helical torsion spring 30a has one end secured in an opening in the underside of the worm wheel 28a and its other end secured in an opening in the upper side of the detent wheel 43a. Thus, upon rotation of the worm 33a by the drive motor (not shown), the worm wheel 20a is rotated which is effective to rotate the shaft 20a and the helical torsion spring 30a. With rotation of the spring 30a, the code wheel, the detent wheel and the symbol wheel are rotated until the symbol wheel reaches its desired location. At that time the pawl (not shown) is actuated as above described to engage the detent wheel 43a and to stop the rotation of that wheel as well as the symbol wheel 10a and code wheel 25a. The worm 33a continues to rotate thus to rotate the worm wheel 28a and the shaft 20a and to wind the spring 30a. As previously described the drive motor continues to rotate the worm and there is avoided a shock stopping of the motor. When the pawl is withdrawn from engagement with the detent wheel that wheel as well as the symbol wheel and code wheel are released and the potential energy stored in the spring 30a provides an instantaneous release of energy to cause the immediate rotation of all three wheels 10a, 43a and 25a.

Figure 3:
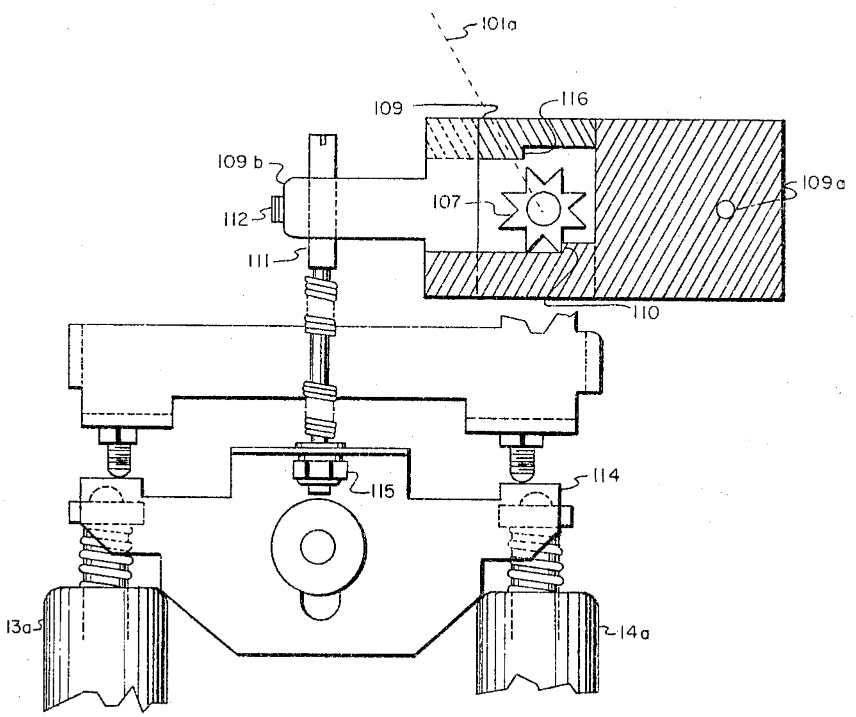
FIG. 3 is a plan view of the ribbon escapement.

Coming now to FIGS. 3 and 4, there is shown in detail a ribbon advance mechanism for the printing apparatus. There is provided a supply wheel of typewriter ribbon which preferably may be a suitably coated Mylar ribbon. The ribbon is lead from the supply reel and passed under the solenoid plungers and symbols and up to engage an idler roller 100 which rotates about a fixed shaft secured to the printing apparatus structure. The ribbon is then fed around a friction roller 101 and between the friction roller and a pressure roller 103 to a take-up spool 105. The pressure roller 103 is spring loaded against the friction roller 101 by way of its shaft and a biasing spring. The take up spool 105 is motor driven so that it rotates a clockwise direction and maintains a constant take up force tending to pull the ribbon and wind it about the spool.

However, the ribbon is held between the rollers 101 and 103 as a result of the friction roller 101 not being able to rotate on its shaft 101a, one end of which is connected to an escapement wheel 107. The escapement wheel 107 is prevented from rotating by the forward end of a tooth being engaged by a step 110 of an escapement arm 109. The escapement arm 109 is rotated about a shaft 109a fixed to the printing apparatus frame and is maintained in its position by a pivot pin 111 engaged in an opening of a forward arm 109b of the escapement arm 109. The pin 111 is secured in the opening in the arm 109b by a set screw 112 and the other end of the pin 111 is secured to an actuator member 114 by a fastening device 115.

Each end of the member 114 rests on a respective solenoid armature 13a and 14a of solenoids 13 and 14. When either one of the solenoids 13 and 14 is actuated its respective armature 13a and 14a becomes magnetized and as it moves downwardly it attracts the member 114 and causes an end of the member 114 to move downwardly. As a result the pin 111 moves downwardly and causes a counterclockwise rotation of the escapement arm 109 of sufficient magnitude to release the edge of the escapement wheel 107 by the lower step 110 and almost simultaneously the upper step 116 engages the forward end of another tooth of the escapement wheel 107. In this manner, with one of the plot solenoids being energized and a symbol being printed, the escapement wheel 107 is allowed to rotate a very small amount.

After the symbol has been printed and the plot solenoid deenergized the solenoid armature returns to its normal position and the pin 111 moves in an upwardly direction to rotate the arm 109 in a clockwise direction about the shaft 109a. Thus, the upper tooth of the wheel 107 is disengaged from the upper step 116 and a next succeeding tooth is engaged by the lower step 110. In this manner the escapement wheel 107 is allowed to rotate clockwise the distance of one tooth which rotation allows the friction roller 101 to rotate that distance. It will be understood that both the roller 101 and the wheel 107 are biased to turn clockwise as a result of the force exerted by the motor driven take up spool 105 tending to pull the ribbon toward the spool. In this manner for each energization of either one of the solenoids 13 and 14 the ribbon is taken up by the take up spool 105 a predetermined amount proportional to the distance between the teeth of the escapement wheel 107.

Now that the principles of the invention have been explained it will be understood that many modifications may be made all within the scope of the appended claims.

What is claimed is:

1. Printing apparatus having a rotatable symbol wheel secured to a drive shaft comprising a drive wheel rotatably mounted on said shaft, a resilient member connected between said drive wheel and said shaft, drive means for rotating said drive wheel thereby to rotate said shaft and said symbol wheel, control means for (1) stopping the rotation of said symbol wheel at a desired symbol printing position whereby said drive wheel continues to be rotated for storing energy in said resilient member in the form of potential energy until the force stored in said resilient member equals the driving force of said drive means and (2) releasing said symbol wheel for releasing said potential energy which imparts an instantaneous force on said symbol wheel causing its immediate rotation, means for operating said symbol wheel including first and second solenoid means separated a predetermined distance whereby upon actuation of said first solenoid means a symbol is printed in a first direction and upon actuation of said second solenoid means a symbol is printed in a second direction, first and second code pickup means connected to said symbol wheel for producing character codes corresponding to the position of said symbol wheel with respect to the position of said first solenoid means when said first solenoid means is to be actuated and for producing character codes corresponding to the position of said symbol wheel with respect to the position of said second solenoid means when said second solenoid means is to be actuated, and means connected to said first and second code pickup means and to said stopping means for actuating said control means to stop the rotation of said symbol wheel at a desired symbol printing position with respect to either said first or said second solenoid means and to then actuate the respective solenoid means to print a desired symbol.

2. The printing system of claim 1 in which there is provided means for passing ribbon under each said symbol wheel comprising escapement means for take-up of said ribbon in discrete amounts.

3. The printing apparatus of claim 1 in which there is provided means for passing a predetermined amount of ribbon under each said symbol wheel comprising an escapement arm and an escapement wheel, friction means for taking up said ribbon a predetermined amount upon a discrete amount of rotation of said escapement wheel, and means connecting said escapement arm to said operating means for providing rotation of said escapement wheel a discrete amount upon actuation of said operating means.

References Cited by the Examiner

UNITED STATES PATENTS

| | | | |
|---|---|---|---|
| 2,271,673 | 2/1942 | Zenner | 178—34 |
| 2,365,913 | 12/1944 | Stenfors | 197—55 X |
| 2,415,909 | 2/1947 | Potts | 178—34 |
| 3,041,964 | 7/1962 | Simpson et al. | 101—93 |
| 3,085,504 | 4/1963 | Paige et al. | 101—93 |
| 3,135,195 | 6/1964 | Potter | 197—49 X |

OTHER REFERENCES

L18247 VIIIa/21a', 8–56, Kratt (German printed application).

References Cited by the Applicant

UNITED STATES PATENTS

| | | |
|---|---|---|
| 2,382,668 | 1945 | Salmon. |
| 2,702,623 | 1955 | Pelton. |
| 2,734,614 | 1956 | Page. |
| 2,872,016 | 1959 | Sharpe. |
| 3,048,254 | 1962 | Morris. |

ROBERT E. PULFREY, *Primary Examiner.*

EDGAR S. BURR, *Assistant Examiner.*